OUTPUT COUPLING CIRCUIT FOR MICROWAVE TUBE APPARATUS

Original Filed Aug. 6, 1959 5 Sheets-Sheet 1

INVENTORS
ROBERT S. SYMONS
ARMAND STAPRANS
BY Harry E. Aine
ATTORNEY

March 21, 1967 R. S. SYMONS ETAL 3,310,704

OUTPUT COUPLING CIRCUIT FOR MICROWAVE TUBE APPARATUS

Original Filed Aug. 6, 1959 5 Sheets-Sheet 2

INVENTORS
ROBERT S. SYMONS
ARMAND STAPRANS
BY Harry E. Aine
ATTORNEY

March 21, 1967 R. S. SYMONS ETAL 3,310,704

OUTPUT COUPLING CIRCUIT FOR MICROWAVE TUBE APPARATUS

Original Filed Aug. 6, 1959 5 Sheets-Sheet 3

INVENTORS
ROBERT S. SYMONS
ARMAND STAPRANS

BY Harry E. Aine

ATTORNEY

OUTPUT COUPLING CIRCUIT FOR MICROWAVE TUBE APPARATUS

Original Filed Aug. 6, 1959 5 Sheets-Sheet 4

INVENTORS
ROBERT S. SYMONS
ARMAND STAPRANS
BY Harry E. Aine
ATTORNEY

INVENTORS
ROBERT S. SYMONS
ARMAND STAPRANS
BY Harry E. Aine
ATTORNEY 3,310,704

OUTPUT COUPLING CIRCUIT FOR MICROWAVE TUBE APPARATUS

Robert S. Symons, Los Altos, and Armand Staprans, Mountain View, Calif., assignors to Varian Associates, Palo Alto, Calif., a corporation of California Original application Aug. 6, 1959, Ser. No. 832,402, now Patent No. 3,169,206, dated Feb. 9, 1965. Divided and this application Aug. 29, 1962, Ser. No. 220,325

4 Claims. (Cl. 315—5.39)

The present invention is a divisional application of parent application, Ser. No. 832,402, filed Aug. 6, 1959, now issued as U.S. Patent 3,169,206 on Feb. 9, 1965, and assigned to the same assignee as the present invention and relates in general to high frequency tubes and more particularly to a novel high power, pulsed, UHF, broad band amplifier useful, for example, in applications as navigation and communication systems, as a driver for a linear accelerator, and the like.

The present invention encompasses two models of the novel high frequency high power klystron amplifier. The first model comprises a UHF seven cavity variably tuned klystron amplifier having a 45% R.F. efficiency and providing a 3% one-half power bandwidth tunable over a 12% full power range. This tube is approximately nine feet long and including only the evacuated structure weighs approximately seven hundred pounds. The tube will deliver 8 megawatts peak R.F. energy with an average power of approximately 30 kw.

The other tube is a fixed tuned five cavity UHF klystron amplifier having a half power bandwidth of approximately 12% to 14% with an R.F. efficiency of 32%. This tube is approximately eleven feet in length and including only the evacuated structure weighs approximately 700 pounds. The tube will deliver at UHF frequency 8 to 10 megawatts peak R.F. power with an average R.F. power of 30 k.w.

The principal object of the present invention is to provide an improved high frequency klystron amplifier tube apparatus which is relatively simple of construction, relatively easy to handle, and which will have long operating life while delivering high peak and high average R.F. power.

One feature of the present invention is the provision of an output waveguide assembly wrapped around the collector assembly whereby the focus solenoid may more readily extend up to and around the collector region to facilitate focusing of the beam in the output cavity.

Another feature of the present invention is the provision of a cylindrical vacuum tight R.F. window sealed around the center conductor of a door knob transition in the output R.F. circuit thereby providing a large area R.F. window which allows high peak and high average R.F. power to be passed therethrough.

Another feature of the present invention is the provision of a broad band output circuit including, the output cavity, and a resonant section of waveguide communicating with the output cavity through the intermediary of a tuned iris whereby an extremely broad band R.F. output circuit is obtained.

Figure 1:
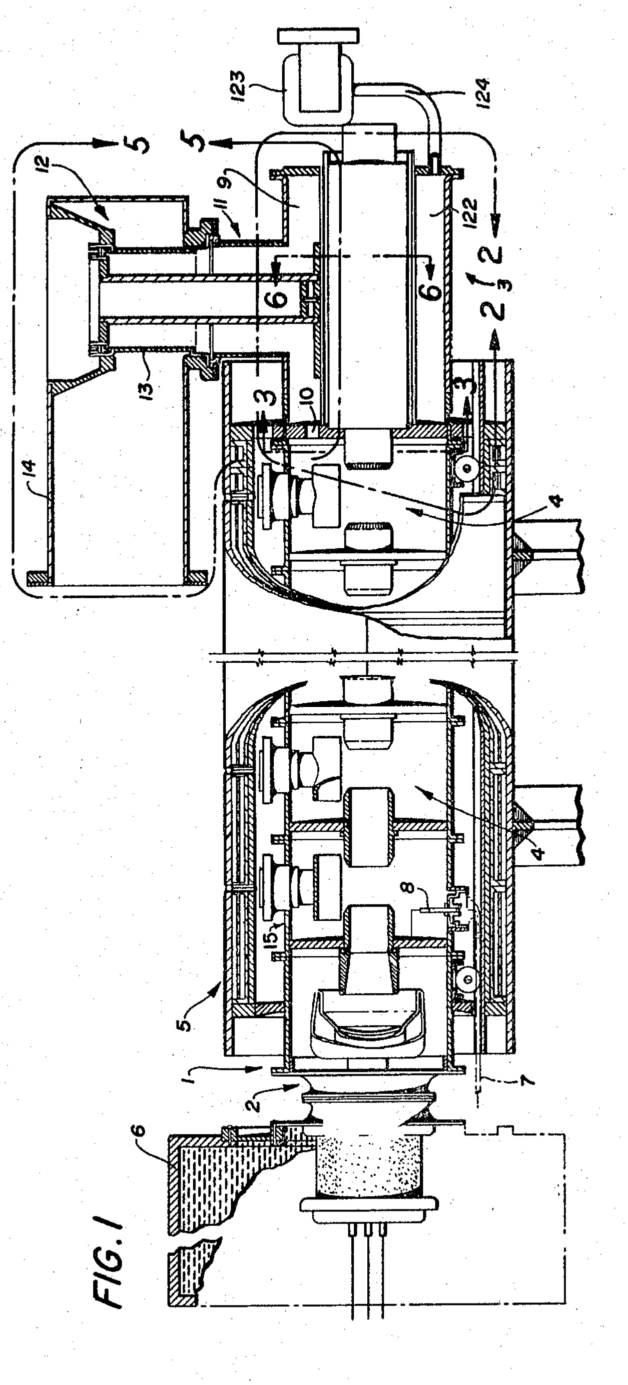
Figure 2:
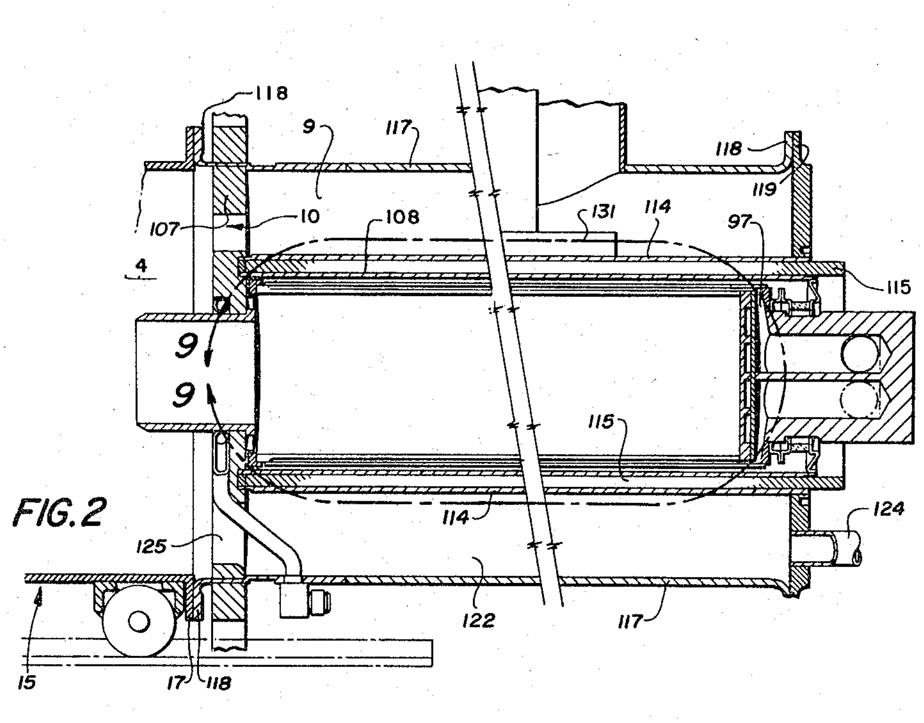
Figure 3:
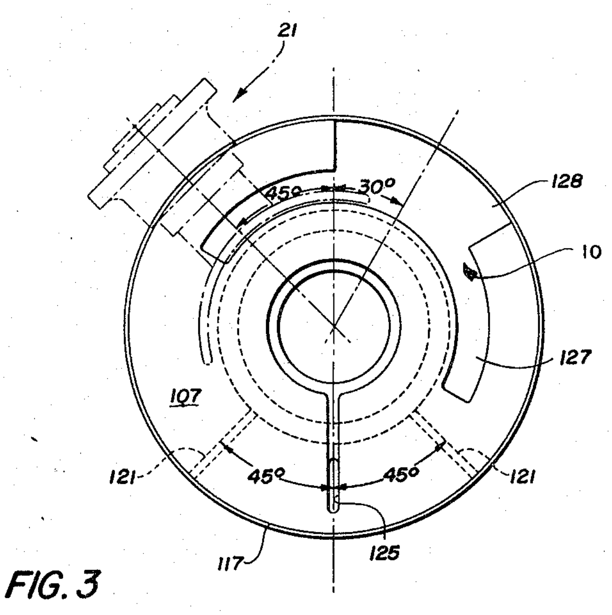
Figure 4:
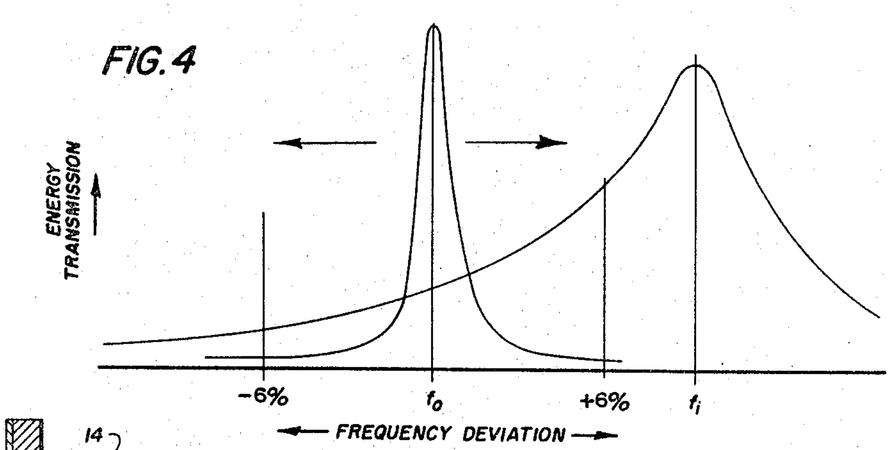
Figures 5, 5A:
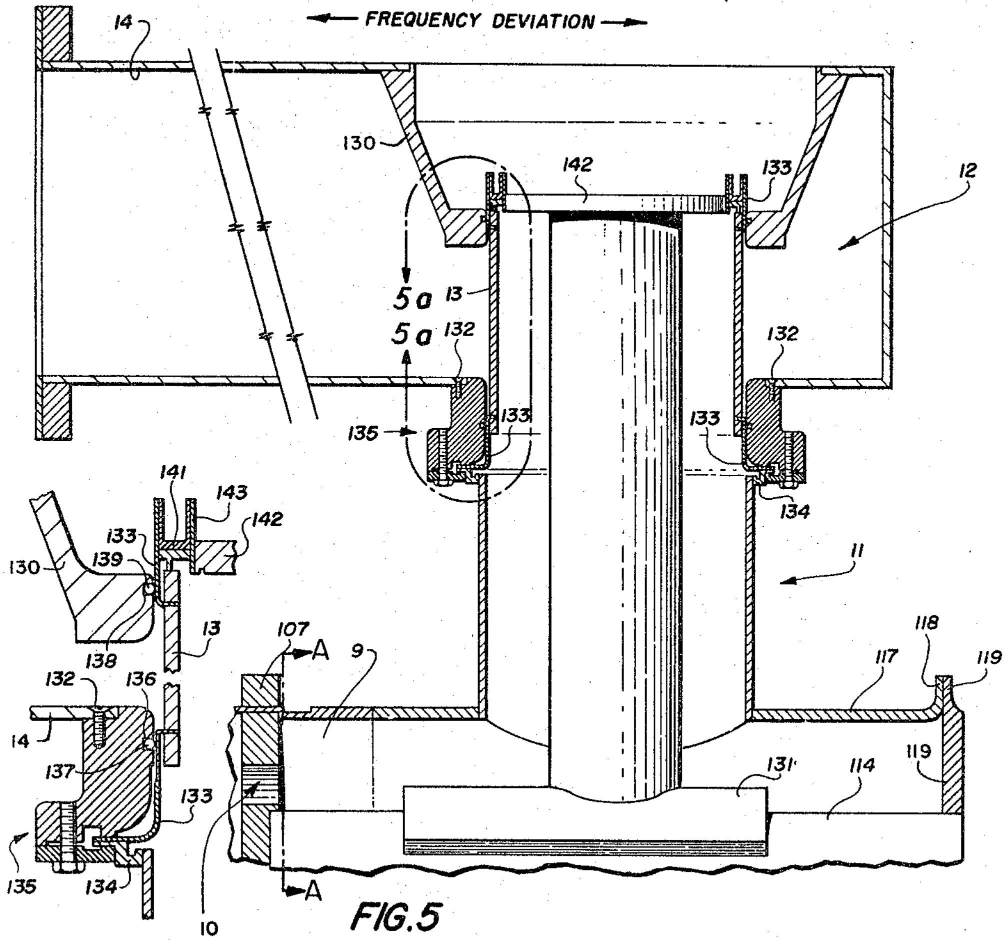
Figures 6, 7:
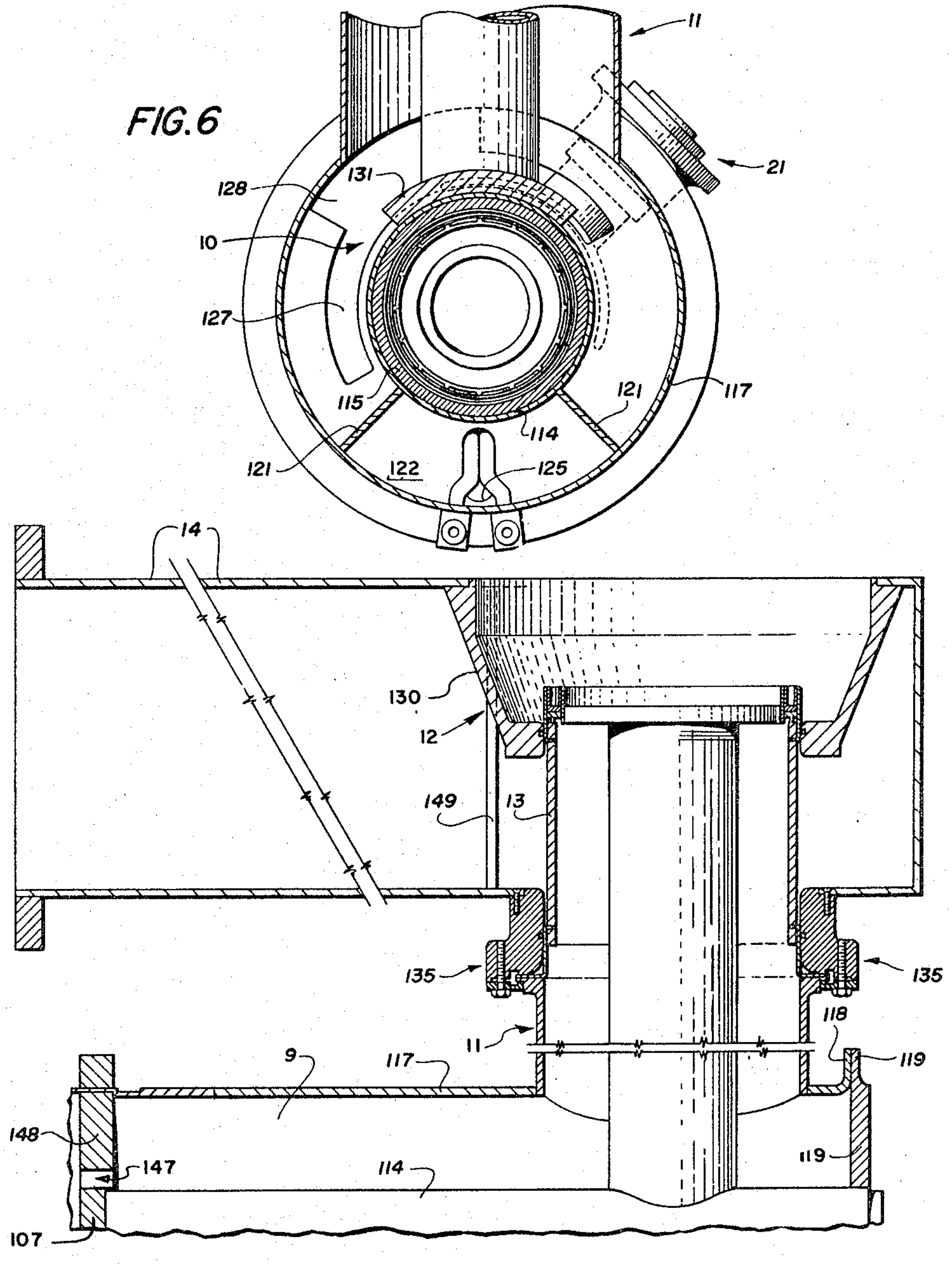
Figure 8:
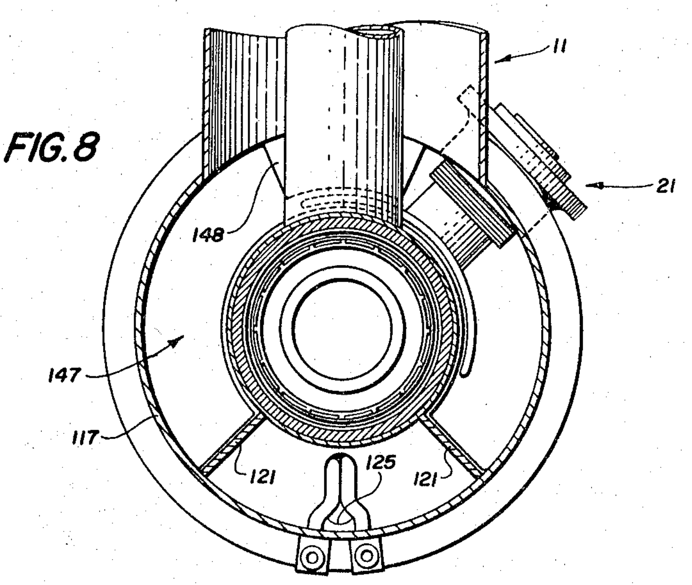
Figure 9:
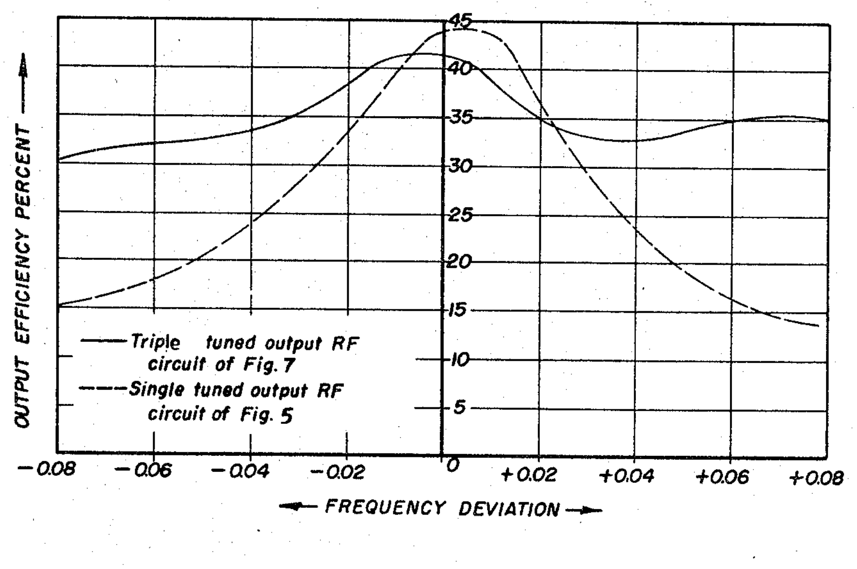

Other features and advantages of the present invention will become apparent upon a perusal of the following specification taken in connection with the accompanying drawings wherein, FIG. 1 is a longitudinal view, partly in section, showing the multicavity klystron amplifier apparatus of the present invention, FIG. 2 is an enlarged foreshortened view of a portion of the structure of FIG. 1 delineated by line 2—2, FIG. 3 is an enlarged cross sectional view of a portion of the structure of FIG. 1 taken along line 3—3 in the direction of the arrows, FIG. 4 is a typical graph of energy transmission versus frequency deviation for the coupling structure shown in FIG. 3, FIG. 5 is an enlarged cross sectional view of a portion of the structure of FIG. 1 delineated by line 5—5, FIG. 5*a* is an enlarged foreshortened view of a portion of the structure of FIG. 5 delineated by the line 5*a*—5*a*, FIG. 6 is an enlarged cross sectional view of a portion of the structure of FIG. 1 taken along line 6—6 in the direction of the arrows, FIG. 7 is an enlarged cross sectional view of an alternative embodiment of the same portion of the structure of FIG. 1 as delineated by line 5—5, FIG. 8 is an enlarged cross sectional view of an alternative embodiment of the structure of FIG. 1 taken along a line the same as 6—6 in the direction of the arrows, and FIG. 9 is a graph of output efficiency in percent versus frequency deviation for the klystron amplifier tube apparatus of FIG. 1 utilizing the alternative embodiment structures shown in FIGS. 7 and 8.

Referring now to FIG. 1 there is shown a longitudinal partly cross sectional view of a high frequency high power multicavity klystron tube apparatus utilizing features of the present invention. More specifically, the tube comprises an elongated tubular metallic envelope 1 having an electron gun assembly 2 at one end thereof for producing and directing the beam of electrons axially through the elongated vacuum envelope 1 to an electron collector assembly 3 mounted at the other end of the elongated envelope 1. A plurality of cavity resonators 4 are provided between the cathode assembly 2 and the collector assembly 3 for successive electromagnetic interaction with the beam of electrons passable therethrough.

A beam focusing solenoid 5 envelops the central portion of the tube's envelope for focusing the electron beam throughout the length of the tube apparatus. The free end portion of the cathode assembly 2 is inserted within an oil tank 6 and sealed therewithin via suitable mating flanges provided on the tube envelope 1 and the oil tank 6. The oil in the oil tank serves to prevent electrical breakdown across the high voltage anode to cathode insulator of the cathode assembly 2.

Electromagnetic energy which it is desired to have amplified by the tube is fed to the first cavity 4 of the tube via coaxial line 7 and input loop 8. This R.F. energy serves to velocity modulate the beam, such velocity modulation being transformed into current density modulation as the beam travels down the length of the tube. The current density modulation is further enhanced by successive cavities 4. The current density modulation serves to excite the last or output cavity 4. The greatly amplified R.F. output energy is extracted from the output cavity 4 via a suitable coupling iris 10 and hollow waveguide 9. The waveguide 9 is wrapped around the collector assembly 3. The output R.F. energy is extracted from the waveguide 9 via a coaxial line 11 and thence fed via a doorknob transition 12, having a cylindrical wave permeable window 13 vacuum sealed therein, to an output rectangular waveguide 14.

The collector assembly 3 (see FIG. 2) is of substantially the same modular construction as the midsection of the tube and is fixed to the midsection of the tube via the intermediary of an outer tubular member 117 provided with outwardly directed flanges 118 at both ends thereof. One flange 118 is sealed to the mating flange 17 of the last midsection module 15 as by welding. The other free end of the outer tubular member 117 is closed off by a transverse annular header 119 as of, for example, stainless steel sealed as by welding between the ends of the cylinder 114 and outer tubular member 117, thereby defining a cylindrical chamber between the two cylindrical members 114 and 117 (see FIGS. 3 and 6). This cylindrical chamber is divided into a 90° sector and a 270° sector respectively via the intermediary of two longitudinally extending partitions 121 as of, for example, stainless steel connected between the pole piece 107 and the annular header 119. The 270° sector (see FIG. 2) defines the wrapped output waveguide 9 and the 90° sector provides a chamber 122 providing an air evacuation passage between the midsection of the tube and a cold cathode discharge getter pump 123 (see FIGS. 1 and 2) connecting into the chamber 122 via the intermediary of tubing 124 and a suitable opening in the transverse header 119. Chamber 122 communicates with the output cavity 4 via the intermediary of a suitable opening 125 in the output magnetic pole piece 107.

Referring now to FIGS. 3 and 6 there is shown a novel broad band low capacitance coupling iris 10 utilized for coupling wave energy from the output cavity 4 to the wrapped-around waveguide 9 in the tunable seven cavity klystron amplifier model of the present invention. More specifically, the transverse wall of the output cavity 4 formed by the pole piece 107 is provided with a coupling iris 10 in the form of a portion of an annular slot 127 which subtends approximately 180° of circumferential arc about the longitudinal axis of the tube. The coupling slot 127 is symmetric with respect to a radius extending at an angle of 30° to the vertical to offset the R.F. coupling effect of the tuner assembly 21 primarily due to the capacitive tuning plate 22. The central portion of the coupling slot 127 is enlarged radially outwardly at 128 thereby decreasing the capacitance of the iris 10 as compared to the capacitance of a coupling iris having a uniform height.

Decreasing the capacitance of the iris 10 not only raises its resonant frequency but tends to decrease the Q of the coupling iris 10 whereby greater bandwidth may be obtained. In this particular tunable tube model of the present invention it was desirable to have a broadband coupling iris coupling the output cavity 4 to the load. Moreover, it was desirable that this coupling iris have an increasing coupling effect with increasing frequency to compensate for decreasing interaction between the output cavity 4 and the beam with increasing frequency whereby uniform R.F. coupling to the load could be obtained over a wider band of frequencies. Therefore, the resonant frequency $f_i$ of the iris 10 was selected slightly higher than the tunable range of the tube (see FIG. 4), the resonant frequency of the output cavity 4 being tunable over the 12% band and the resonant frequency of the cavity 4 being $\bar{f}_o$.

In other applications it may be desirable to provide an output iris 10 with a decreasing coupling coefficient with increasing frequency in which case the resonant frequency $f_i$ of the broadband iris 10 would be selected slightly lower than the tunable range of the tube. In the particular seven cavity tunable klystron model of the present invention, the output coupling iris 127 provided the desired coupling characteristic for the output cavity over a 12% bandwidth while passing 10 megawatts peak and 30 kw. average power. In a particular exemplary coupling iris 10 the pole piece 107 was approximately one inch thick, the height of the narrow slot portion 127 of the iris 10 was approximately one inch and the height of the central large portion 128 of the iris 10 was approximately 2.6". The iris 10 fed the output waveguide 9 having a mean radius of approximately five inches and a height of approximately 2.6".

The wrapped around output waveguide 9, as shown in FIGS. 1, 3, 5 and 6, is a very important feature of the present invention as it provides means for extraction of very high R.F. power from the output cavity 4 without the necessity of bringing the waveguide out through a break in the beam focus solenoid 5. In this manner the beam focus solenoid 5 may extend up to and around the output cavity 4 thereby providing beam focusing in the output cavity 4 where it is most needed.

The R.F. output circuit for the tunable seven cavity klystron amplifier model of the present invention is shown in FIGS. 5 and 6. The waveguide portion of this output circuit including waveguide 9, coaxial line 11, doorknob transition 12 and output waveguide 14 are impedance matched such that the aforementioned waveguide sections from plane A—A to the rectangular output waveguide 14 provide a reflectionless transmission line over the entire 12% tuning range of the tube.

The reflectionless matching is obtained by two broad band waveguide transitions. The first of these transitions is from the output waveguide 9 to the coaxial line 11. This transition is matched over the desired frequency band by saddle 131 of semi-cylindrical shape and made of a good conducting material as of, for example, copper. The saddle 131 is fixedly secured to the outer periphery of cylinder 114 which forms the bottom wall of the waveguide 9. The capacitive discontinuity produced by the saddle 131 is balanced by an inductive discontinuity formed by the shorted length of waveguide 9 between the coaxial transmission line 11 and the annular header 119. Typical dimensions for an exemplary first transition at UHF frequencies are: ten inches from the center of the coupling iris 10 to the center line of the coaxial transmission line 11, approximately four inches from the pole piece 107 to the beginning portion of the saddle 131, ten inches for the length of the saddle, approximately 0.6" for the height of the saddle 131, and approximately five inches for the length of the shorted section of waveguide between the intersection of the coaxial line 11 and shorting header 119. In this particular example the coaxial line 11 outer conductor had an inner diameter of approximately eight and a half inches and the inner conductor had an outer diameter of approximately 3.6".

The coaxial line 11 is matched to the output waveguide 14 via the intermediary of the second R.F. transition or doorknob transition 12.

The incorporation of the cylindrical R.F. window 13 into the doorknob transition 12 forms another feature of the present invention. More specifically (see FIG. 5*a*) the cylindrical R.F. window 13 as of, for example, alumina ceramic eight inches in diameter, six inches in length and ¼" thick, is sealed in a vacuum tight manner at its ends via annular thin walled frame members 133 as of, for example, Kovar. The annular frame members 133 are provided with inwardly directed flanges which are sandwich brazed between two segments of the ceramic window 13 whereby the shear forces produced by unequal thermal expansion between the Kovar and the alumina ceramic are equally divided between both sides of the sealed inwardly directed flange portion of the frame 133. Annular frame member 133 spaced closest to the collector assembly 3 is provided with an outwardly directed flange portion sealed about its periphery as by welding to a similar outwardly directed mating flange member 134 carried from the outer conductor of the coaxial line 11. A coaxial line to waveguide adaptor 135 is clamped over the mating flanges 133 and 134 and is connected at its other end to the output waveguide 14 as by a plurality of screws.

The waveguide adaptor 135 is provided with a recess 136 at its inner periphery for carrying therewithin a helical wound silver plated beryllium copper spring 136 having an outside diameter slightly larger than the depth of the recess, the protruding portion of the spring 137 riding in slidable engagement with the outside surface of the window frame 133 whereby good electrical contact is assured therebetween. This slidable R.F. contact between the waveguide adaptor 135 and the R.F. window frame 133 assures a good electrical connection between the waveguide 14 and the coaxial line 11 while permitting relative movement of the window 13 and the waveguides 14 and 11 to allow for thermal expansion and contraction of the R.F. window and frame members, in use and to prevent undue thermal stresses being placed upon the window 13.

Similarly, the inner circumference of a doorknob 130 is recessed at 138 to receive a helical silver plated beryllium copper spring 139 which makes good electrical contact with the annular window frame member 133. The annular window frame member 133 most remote from the collector assembly 3 is vacuum sealed to the inner conductor of the coaxial line 11 via the intermediary of a thin wall annular channel 141 and flanged annular header 142, as of, for example, stainless steel. The header 142 is brazed to the copper inner conductor of the coaxial line 11 and provided with outwardly directed flange member 143 for vacuum sealing to the mating channel 141 as by welding.

The provision of the cylindrical R.F. window 13 in the doorknob transition 12 allows a relatively large area of window to be utilized whereby very high average power may be passed therethrough without producing local overheating in use. Moreover, disposing the R.F. window 13 in the doorknob transition 12 removes the window from the area of the output gap in the output resonator 4 whereby the window is not exposed to bombardment by secondary electrons generated in the output cavity, and thus charging of the output window 13 by secondary electron emission is prevented in use.

It has been found that a reflectionless R.F. output circuit constructed as described above allows very large peak power as of, for example, 10 megawatts and substantial average power as of, for example, 30 killowatts to be passed therethrough over a 12% bandwidth without producing electrical breakdown of the window and other harmful results.

Referring now to FIGS. 7 and 8 there is shown a broad band R.F. output circuit utilized with the five cavity fixed tuned broad band klystron amplifier model of the present invention. This broad band R.F. circuit is similar in many respects to the previously described R.F. output circuit as utilized with the seven cavity tunable model. Therefore only the differences between this model and the previously described model will be pointed out in detail. In particular, the output R.F. circuit is not a reflectionless waveguide from the output iris 10 to the load, but instead discontinuities are arranged within the waveguide 9 and doorknob transition 12 to produce reflections such that these output waveguide sections act as a cavity resonator which is coupled to the output resonator 4 via the intermediary of a capacitive loaded resonant coupling iris 147 in the collector pole piece 107.

The capacitive loaded coupling iris 147 is shown in FIG. 8 and has a height substantially equal to the height of the waveguide 9 and circumferentially subtends an arc of approximately the full 270° of the waveguide 9. The iris 147 is provided with a capacitive loading slug member 148 centrally of the iris 147 to provide a relatively high Q coupling circuit for coupling the output cavity 4 to the resonant output waveguide 9.

The output waveguide 9 is made resonant by the provision of a first discontinuity at the intersection of the coaxial line 11 and the waveguide 9. It will be noted that the matching saddle 131 which had previously been used in the other R.F. output circuit has been left out in this output circuit to form the first waveguide to coaxial line discontinuity. The effect of this discontinuity is further enchanced by selection of the proper spacing between the junction of the coaxial line 11 and the shorted waveguide 9. For example, it can be seen that the section of shorted waveguide defined by the distance from the junction of the coaxial line 11 to the shorting header 119 is substantially less in this R.F. circuit design. As a typical example of dimensions utilized in the present resonant section of waveguide 9, the distance from the pole piece 107 to the center line of the coaxial line 11 was approximately eighteen inches and the distance from the center line of the coaxial line 11 to the shorting header 119 was approximately 5.7". In both tube models the transverse dimensions of the waveguide 9 and coaxial line 11 are the same.

A second waveguide discontinuity serving to form the resonant section of waveguide 9 is the provision of an inductive iris 149 disposed in the vicinity of the doorknob transition 12. In this case, the inductive iris 149 comprises two conducting partitions extending from the top to the bottom of the waveguide 14 and extending inwardly of the waveguide approximately 2.2".

The effect of the inductive iris 149, mismatch of the transition from the coaxial line 11 to the waveguide 9, and the provision of the relatively high Q coupling iris 147 closely coupled to the output cavity 4, is to produce a triple tuned R.F. resonant output circuit having a relatively broad bandwith, in excess of 16%, as can be seen by the graph shown in FIG. 9.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency tube apparatus including; means for producing and directing a beam of charged particles over a predetermined path longitudinally of the tube; means for collecting the beam at the terminating end of the beam path; means forming a wave supporting structure disposed along said beam path for producing successive electromagnetic interaction with the beam and for extracting high frequency wave energy from said beam for propagation to a suitable load; a vacuum tight envelope enclosing the beam path; said means for extracting wave energy from said beam for propagation to a suitable land including, a hollow tubular waveguide, said waveguide having a portion of its length directed substantially longitudinally of the beam path, said waveguide defined by two mutually opposed longitudinally directed wide side walls interconnected by two longitudinally directed narrow side walls, said wide side walls being arcuate and being wrapped partially around said collector means, whereby the transverse dimension of the tube apparatus including said wave energy extraction means and collector means is minimized.

2. A high frequency tube apparatus including; means for producing and directing a beam of charged particles over a predetermined path longitudinally of the tube; means for collecting the beam at the terminating end of the beam path; means forming a wave supporting structure disposed along said beam path for producing successive electromagnetic interaction with the beam and for extracting high frequency wave energy from said beam; a vacuum tight envelope enclosing the beam path; said means for extracting wave energy from the beam including, a coaxial transmission line coupled to a rectangular waveguide via a doorknob transition, said doorknob transition having a hollow cylindrical wave permeable member vacuum sealed at its ends between the doorknob member of said doorknob transition and the outer conductor of said coaxial line, and said cylindrical wave permeable member being disposed coaxially of the center conductor of said coaxial line in surrounding relation to at least a portion of said doorknob member whereby a relatively large area radio frequency window is provided for passing high radio frequency power therethrough.

3. A high frequency tube apparatus including, means for producing and directing a beam of charged particles over a predetermined path longitudinally of the tube, means for collecting the beam at the terminating end of the beam path, means disposed along said beam path for producing successive electromagnetic interaction with the beam and for extracting high frequency wave energy from said beam, a vacuum tight envelope enclosing the beam path, said means for extracting wave energy from the beam including, an output cavity resonator electromagnetically coupled to the beam, a first hollow tubular waveguide communicating with the fields of said cavity resonator via the intermediary of an output iris having a capacity loading member for capacitively loading thereof, a coaxial transmission line coupled to said first waveguide via the intermediary of a mismatched junction thereby setting up a wave reflection, a second tubular waveguide coupled to said coaxial transmission line via the intermediary of a doorknob transition, said output cavity coupling iris and mismatched first waveguide functioning as an integral multiresonant radio frequency circuit providing a uniform shunt impedance to the gap of said output cavity over a relatively broadband of frequencies.

4. The apparatus according to claim 1 wherein said energy extracting means includes an output cavity resonator coupled to the beam and to said partially wrapped around section of waveguide via the intermediary of an output iris, and further including a second section of tubular waveguide spaced from said first section of wrapped around waveguide, a section of coaxial line interconnecting said first and second sections of waveguide, and a doorknob transition member serving to impedance match said coaxial line to said second section of waveguide.

References Cited by the Examiner

UNITED STATES PATENTS

| | | | |
|---|---|---|---|
| 2,433,011 | 12/1947 | Zaleski | 333—33 |
| 2,786,981 | 3/1957 | Zaleski | 333—33 |
| 2,994,800 | 8/1961 | Lazzarimi | 315—39 X |
| 3,034,014 | 5/1962 | Drexler | 315—39.77 |

HERMAN KARL SAALBACH, *Primary Examiner.*

GEORGE N. WESTBY, S. CHATMON, Jr., *Assistant Examiners.*